Patented May 15, 1945

2,376,310

UNITED STATES PATENT OFFICE 2,376,310

DIMETHYL STYRENE FROM MONOCYCLIC TERPENES

James K. Dixon, Riverside, Conn., assignor to American Cyanamid Company, New York, N. Y., a corporation of Maine No Drawing. Application June 23, 1943
Serial No. 491,939

12 Claims. (Cl. 260—669)

This invention relates to the dehydrogenation of monocyclic terpenes. More particularly, the present invention relates to the production of 4,alpha-dimethylstyrene by the catalytic dehydrogenation of monocyclic terpenes in the vapor phase and is a continuation-in-part of my copending application for U. S. Letters Patent, Serial No. 471,875, filed January 9, 1943.

4,alpha-dimethylstyrene is commonly referred to simply as dimethyl styrene and is so designated in the present specification. In recent years it has been the subject of increasing industrial interest. Among its many uses, polymerized dimethyl styrene is an excellent plasticizer for polymers of many other vinyl compounds and their derivatives. It co-polymerizes readily with such materials as acrylonitrile to produce an excellent molding resin and the co-polymers are also valuable in the production of paints and in coating textiles, paper and the like. Dimethyl styrene polymer itself, is an excellent high temperature insulating oil.

Because of their somewhat analogous structure, the possibility of converting a terpene into dimethyl styrene appears to offer one method of making this desirable material. The reaction involved, for example, in converting a terpene such as dipentene to 4,alpha-dimethylstyrene appears to require only the necessary degree of dehydrogenation. However, the structure of the terpene is such that a shift of hydrogen from one carbon atom to another is also required in order for certain of the terpenes to be converted to dimethyl styrene. This is true of terpinoline, terpinene and the like. Actually, therefore, the reaction is not simple to carry out. It can not be accomplished readily by heating alone but must be activated by the use of a catalyst. Usually when this is attempted, a number of side reactions are introduced and the process is exceedingly difficult to control.

Considerable work has been done, some with a fair degree of success, in converting monocyclic terpenes such as dipentene to cymene. This was done because cymene appeared to be a more suitable starting point than the terpenes themselves for the manufacture of styrenes. In my previously mentioned copending application, Serial No. 471,875, I have disclosed an improved procedure for carrying out the conversion of monocyclic terpenes to cymene in the presence of an improved catalyst using a temperature range of about 350–500° C.

However, a two-stage process, even making use of the improved method of producing cymene set forth in my aforementioned copending application, suffers from certain practical drawbacks. It necessitates the carrying out of a two-step process. In many cases this requires a duplication of process steps. Not only does this increase the cost, waste time and unnecessarily tie up the apparatus, but it also almost doubles the handling and distilling losses. For example, there is a distinct tendency for dimethyl styrene and a by-product, 4-methylstyrene to polymerize during distillation. The necessary use of vacuum to overcome this tendency creates losses of 10–20%. In addition, carrying out the reaction in two steps creates further losses of product because of the opportunity for two different sets of side reactions to occur.

There remains a demand for a suitable process whereby terpenes may be converted to dimethyl styrene in a single operation. It is, therefore, an object of the present invention to develop such a process, whereby a maximum conversion of a monocyclic terpene to 4,alpha-dimethylstyrene may be obtained in a single stage.

In general, the object of the present invention is accomplished by vaporizing the terpene and passing the vaporized material over a suitable dehydrogenation catalyst maintained at elevated temperatures up to about 625–675° C. By carrying out the reaction under these conditions I have found that direct conversion of a monocyclic terpene to 4,alpha-dimethylstyrene can be carried out in a single operation. The product is of high quality and can be readily isolated in good yields.

As pointed out in my previous application, in that process use is made of reaction temperatures considerably exceeding those which were believed practical for the purpose in the prior art. In developing that process, the surprising discovery was made that one of the side reaction products of the improved process was dimethyl styrene. It has now been found that the reaction which produces the mixture comprising dimethyl styrene, menthane, cymene, hydrogen and other products can be catalytically influenced so as to favor the direct conversion to dimethyl styrene as the principal product. This is accomplished in general by controlling the contact time and using still higher temperatures.

The results obtained by the process of the present invention in which the reaction is carried out at temperatures up to about 700° C. are particularly surprising in view of the established prior art. Previous experience, for example, indicates that at temperatures above about 300–

350° C., dehydrogenation catalysts generally tend to break down dipentene to gaseous products containing less than 10 carbon atoms. Contrary to the results which would be anticipated from such teachings, at the high temperatures used in the present process it is possible to produce dimethyl styrene directly in one stage without excessive cracking.

Actually, in carrying out the process of the present invention it is desirable to control the temperature of the catalyst mass at the optimum value. Practically, the maintenance of a uniform catalyst temperature at high temperature levels is difficult to accomplish. It is much easier from an operating point of view to have the initial portion of the catalyst at a temperature lower than the average value for the final portion. The latter can be readily held at an optimum average level which is sufficiently uniform for all practical purposes. Similarly, it is not absolutely essential that the exit temperature be exactly at the optimum for the reaction as a whole, provided a sufficient portion of the catalyst mass is maintained at the proper temperature level.

Fortunately, in the process of the present invention, the entire catalyst body need not be maintained at a uniform high temperature. It has been found that a satisfactory result may be obtained if the vaporized material is brought into contact with a portion of the catalyst maintained at the desired temperature for a short contact period of from 2-20 seconds. Consequently, it is only necessary that a sufficient portion of the catalyst body be maintained at an average temperature within the desired limits of the permissible temperature range. This is particularly advantageous since as pointed out above, it is exceedingly difficult to maintain a uniform average high temperature throughout the entire catalyst mass.

Not only need the catalyst temperature be maintained at a uniform temperature level throughout but it is often of advantage not to do so. As pointed out in my aforementioned copending application, Serial No. 471,875, attempts to raise the vapor temperature too rapidly in the presence of the catalyst produces excessive cracking before the desired reaction is initiated. This is probably due in a large part to localized overheating at the walls of the conversion chamber. Therefore, if the catalyst is at too high temperature when the vapors are initially contacted therewith, the yield may be reduced. However, since the yield of dimethyl styrene does not become appreciable until a temperature of about 450-500° C. is reached there is no real value in contacting the vapors with a catalyst at a lower temperature.

Effective operation of the present process can be carried out by passing the terpene vapors directly from the vaporizer into contact with the catalytic mass when the initial portion of the latter is at about 450-500° C. The temperature of the vapors can then be raised to the necessary average final temperature of about 600-700° C. without excessive cracking. The principal difficulties can be readily avoided by pre-heating the terpene vapors in the absence of a catalyst to approximately that temperature which is to be desired in the initially contacted catalyst zone. In this way the initial portion of the catalyst can be maintained at a high temperature. Advantage can be taken of this in two ways, either a larger amount of product can be produced without the same amount of catalyst or a smaller amount of catalyst can be used to produce the same amount of product obtainable without preheating.

On the other end of the scale, the equilibrium conditions for the production of dimethyl styrene becomes more and more favorable up to about 675-700° C. At this point cracking of dimethyl styrene to other products such as p-methyl styrene, benzene, toluene, and the like becomes appreciable. It is preferable, therefore, since the catalyst body can not be readily maintained at a uniform temperature throughout its mass, that the minimum temperature does not fall below about 450° C. and that a substantial portion of the mass be maintained between 600-700° C., preferably 600-650° C.

The process of the present invention is not necessarily limited to the use of any particular apparatus. It is necessary that the material be converted to the vapor state and passed over the catalyst at a rate depending upon the temperature and the volume of the catalytic mass. The reacted vapors may be collected by condensation and separated into their component parts as by fractional distillation. So long as these functions are carried out the exact structure of the apparatus may be varied at will without departing from the scope of the present invention. Nor is the process limited to any particular materials from which the apparatus is to be constructed. Much of the development work was carried out using stainless steel reaction vessels. However, any material which is catalytically inactive, does not contaminate the materials and is resistant to intergranular attack by the hydrogen liberated during the reaction may be used.

Nor is the present invention necessarily limited by the nature and source of the raw material. Dipentene which is available in commercially acceptable quantities was found to give excellent results. Other monocyclic terpenes such as terpinolene and the terpinenes may also be used. If so desired, bicyclic terpenes such, for example, as alpha-pinene may be converted to a mixture comprising essentially monocyclic terpenes. This mixture in turn may be used as a starting material for the present process since a mixture of monocyclic terpenes may be used if so desired.

In the process of my copending application it was found that to use a chromium oxide on Activated Alumina catalyst was preferable in order to obtain a yield of cymene at the higher temperature ranges used. In the present modification whereby the principal product is dimethyl styrene, excellent results from the same catalyst were obtained. However, similar results can be also obtained using other difficultly reducible metal oxides as catalysts particularly those of molybdenum and vanadium.

Excellent results can be obtained using these materials alone as catalysts. Chromium oxide gels, for example, were found to give good yields. However, these materials are rather expensive and in some cases difficult to prepare. A suitable carrier upon which these materials can be supported is therefore preferable as in the case of many catalytic reactions. Surprisingly enough, at these temperatures surface-active alumina, itself, was found to give evidence of catalytic activity. As it possesses highly desirable physical characteristics it therefore makes an excellent support. By way of illustration, chromium or molybdenum oxides in amounts of about 2-15% by weight on Activated Alumina gave excellent results in the present process. Nor is it necessary that only a single oxide be used. In fact, the presence of additional metallic oxides, from the catalytically effective group of chromium, molybdenum, vanadium and uranium in small amounts of about 1–10% of the weight of the principal oxide being used were found useful in promoting the catalytic activity. Metallic nickel, copper and the like as well as the easily-reducible metal oxides were found to be unsuitable since they tended to crack the ring structure as well as the isopropyl side chain.

Where an alumina support is used, best results were obtained when use was made of so-called commercial grades of Activated Alumina. As used in the present specification Activated Alumina is intended to include such commercial material as prepared for example by the processes disclosed in U. S. Patents. 1,868,869 and 2,015,593. Fairly good results were also obtained using bauxite. However, the presence of excessive amounts of clays such as kaolin and the like, in the bauxite support should be avoided since materials of this type were also found to promote cracking and reduce the yield of the desirable products.

It is also an advantage of the present invention that it is not particularly critical as to the time of contact between the catalyst and the material being treated. Contact times as short as one second and as long as twenty seconds were found capable of producing satisfactory results. The optimum time of contact obviously varies with the temperature of the catalyst mass. Therefore, that portion of the mass which is at the highest temperatures when non-uniform temperature conditions are used must also be considered in controlling the time. In carrying out the development work it was found that when a portion of the catalyst mass was maintained at temperatures from 600–650° C. that contact times of from two to ten seconds with that portion of the mass gave good results. Too short contact time gives poor conversion and excessive contact time was found to result in excessive cracking.

The invention will be described in greater detail in conjunction with the following specific examples which are meant to be illustrative only and not as limitations on the invention.

*Example 1*

A series of conversions were carried out using redistilled dipentene having an average refractive index $N_D^{20} = 1.4732$ as the starting material. Dipentene was fed to the vaporizer at an average rate of about 12.5 cc./min. and the vapors at about 400° C. passed over the catalyst mass while maintaining the mass at a series of different temperatures. The reaction products were collected by condensation and their respective components determined by fractional distillation. About 1650 cc. of a 10% $Cr_2O_3$ on Activated Alumina catalyst was used. The catalyst was flushed out with nitrogen gas and reactivated by burning off with air between each run. The results are shown in the following table:

*Table 1*

| Catalyst temp. | | | Gas evolved, cu. ft./hr. | Distillation values—per cent of condensate | | | |
|---|---|---|---|---|---|---|---|
| Initial | Middle | Final | | Per cent p-ethyl toluene | Per cent p-methyl styrene | Per cent p-cymene | Per cent dimethyl styrene |
| 400 | 500 | 600 | 5.0 | 9.15 | 1.5 | 39.3 | 34.9 |
| 400 | 500 | 600 | 4.5 | 6.25 | 2.0 | 51.66 | 38.16 |
| 450 | 500 | 605 | 6.5 | 6.19 | 2.0 | 37.60 | 42.04 |
| 500 | 550 | 610 | 7.5 | 5.46 | 1.75 | 33.80 | 43.1 |
| 500 | 500 | 625 | 7.0 | 6.38 | 2.5 | 41.96 | 43.43 |
| 450 | 500 | 653 | 8.0 | 6.5 | 2.8 | 21.0 | 49.8 |
| 400 | 475 | 670 | 8.5 | 10.1 | 13.0 | 9.8 | 39.1 |

The results indicate that little change in the final product was caused by variations in the initial portion of the catalyst but that the final temperature was very important since the dimethyl styrene percentage in the product increased from about 35% at 600° C. to about 45% at 630–650° C. Above about 670° C. the dimethyl styrene content began to decrease appreciably, probably due to cracking.

The other major constituent of the product namely p-cymene can be utilized in a number of different ways. As pointed out above, by suitable treatment it can be converted to styrene such as p-methyl styrene or the 4,alpha-dimethylstyrene of the instant process. Consequently, the p-cymene itself is a valuable product and may be profitably recovered. If so desired it may be recycled in the process of the present invention.

*Example 2*

A sample of distilled dipentene with a refractive index $N_D^{20} = 1.4732$ was dehydrogenated on a molybdenum oxide catalyst which had been deposited on Activated Alumina. The catalyst was prepared by impregnating activated alumina with a solution of C. P. ammonium molybdate followed by drying and ignition at 300° C. in a stream of air and finally by reduction with hydrogen at 300–500° C. The finished catalyst contained 6.4% molybdenum. 500 cc. of catalyst was employed. The initial catalyst temperature was regulated to about 450° C. and the average temperature of final portion was about 630° C. Dipentene was fed to the vaporizer at a steady rate of 8 cc. per minute for about 3 hours the vapors passed over the catalyst and the products collected by condensation. From 1450 cc. of dipentene fed, 1260 cc. of liquid product was recovered. Analysis by careful fractionation of the condensate indicated a yield of 57% p-cymene and 22% dimethyl styrene, the remainder comprising low boiling constituents which were not individually separated and a high boiling residue.

*Example 3*

A sample of distilled dipentene having a refractive index $N_D^{20} = 1.4718$ was vaporized and the vapors dehydrogenated by being passed over a catalyst comprising vanadium oxide on Activated Alumina. Dipentene was vaporized at the rate of 8.5 cc. per minute for five hours. 500 cc. of catalyst having a vanadium content of about 3.7% was used. The initial catalyst temperature was about 450° C. and the average temperature of the final portion was about 625° C. The total volume of gas liberated was about 14.7 cu. ft. and the total weight recovery amounted to 68%. The liquid products, collected by condensation, had a refractive index from 1.499–1.501. The product was analyzed by fractional distillation and found to contain 12% low boiling fraction, 20% xylenes, 13% ethyl toluene, 6% p-methyl styrene, 5% p-menthane, 15% p-cymene, 21% dimethyl styrene, 0% dipentene and 4% high boiling resin.

I claim:

1. A process of producing 4,alpha-dimethylstyrene which comprises vaporizing a monocyclic terpene and passing the vaporized material over a catalyst selected from the group consisting of the difficultly-reducible metal oxides and mixtures of the same, the catalyst mass being maintained at a temperature of from about 450–700° C., whereby a substantial portion of the vaporized material is converted to 4,alpha-dimethystyrene.

2. A process of producing 4,alpha-dimethylstyrene which comprises vaporizing a monocyclic terpene and passing the vaporized material over a catalyst comprising 2–15% by weight of substance selected from the group consisting of the difficulty-reducible metal oxides and mixtures of the same supported on alumina, the catalyst mass being maintained at a temperature of from 450–700° C., whereby a substantial portion of the vaporized material is converted to 4,alpha-dimethylstyrene.

3. A process according to claim 2 characterized in that the support comprises Activated Alumina.

4. A process according to claim 2 characterized in that the vaporized material is initially contacted with a portion of the catalyst having a temperature of about 400–500° C. and the main body of the catalyst mass is maintained at a temperature of from about 500–650° C.

5. A method according to claim 1 in which the cymene content of the condensate is isolated by fractional distillation, vaporized, pre-heated and recycled over the catalytic mass with the fresh feed of terpene vapors.

6. A process of producing 4,alpha-dimethylstyrene which comprises the steps of vaporizing a monocyclic terpene, pre-heating the vaporized material to about 250–450° C. and passing the pre-heated vapors over a dehydrogenation catalyst, at least a substantial portion of which is maintained at a temperature of from about 500° to 700° C., the initially contacted portion of the catalyst being maintained at a temperature of at least 400–450° C., whereby a substantial portion of the vaporized material is converted to 4,-alpha-dimethylstyrene, collecting the reaction product by condensation and isolating the 4,alpha-dimethylstyrene from the condensate by fractional distillation.

7. A method according to claim 6 in which the catalyst mass comprises an oxide of chromium on Activated Alumina, the chromium oxide content being between 2 and 15% of the total weight.

8. A method according to claim 6 in which the catalyst mass comprises an oxide of molybdenum on Activated Alumina, the molybdenum oxide content being between 2 and 15% of the total weight.

9. A method according to claim 6 in which the catalyst mass comprises an oxide of vanadium on Activated Alumina, the vanadium oxide content being between 2 and 15% of the total weight.

10. A method according to claim 6 in which the initially contacted portion of the catalyst is maintained at not less than 500° C. and the high temperature portion of the mass is maintained at from about 550–675° C.

11. A method according to claim 6 in which the initially contacted portion of the catalyst is maintained at not less than 500° C., the high temperature portion of the mass is maintained at from about 550–675° C. and the vaporized terpenes are passed over the catalyst at such a rate as to be in contact with that portion of the catalyst having a temperature of from 550–675° C. for about two to twenty seconds.

12. A method according to claim 6 in which the terpene used is selected from the group consisting of dipentene, limonene, terpinoline, the terpinenes and mixtures of the same.

JAMES K. DIXON.